Oct. 7, 1952        H. J. SHAFER        2,612,906

PRESSURE FLUID ACTUATED OPERATOR FOR PIPE LINE VALVES

Filed June 1, 1946

INVENTOR:
HOMER J. SHAFER
BY Alfred F. Davis
ATTORNEY

Patented Oct. 7, 1952

2,612,906

UNITED STATES PATENT OFFICE 2,612,906

PRESSURE FLUID ACTUATED OPERATOR FOR PIPE LINE VALVES

Homer J. Shafer, Mansfield, Ohio, assignor to The Shafer Valve Co., Mansfield, Ohio, a corporation of Ohio Application June 1, 1946, Serial No. 673,787

1 Claim. (Cl. 137—657)

This invention relates to high pressure valves and in its more specific aspects is directed to a simplified, more reliable and faster acting control for opening and closing the valves.

One of the objects of the invention is to provide a pressure fluid operated valve with a simplified solenoid actuated control which, when momentarily energized will effect an opening or closing of the valve.

Another object of the invention is to provide a piston valve in which the actuating piston constitutes a shut-off valve to the supply line and in which the pressure fluid in the line holds the piston-valve in either open or closed position.

A further object of the invention is to provide a valve having a simple lever control for simultaneously acting upon the intake and exhaust poppet valves so that one of the valves will be open when the other is closed.

Other and further objects of the invention will occur to those skilled in the art to which this invention pertains as the description proceeds which taken in connection with the accompanying drawings sets forth a preferred embodiment thereof and a selected modification but such disclosures are not to be construed as a limitation of the invention which is limited only by the appended claims and any and all modifications, alterations and variations of structure coming within the spirit and scope thereof are deemed to be included herein.

The objects outlined above are obtained in a valve structure disclosed in the accompanying drawings in which 1 designates the body of a parallel disc gate type valve having a suitable cylinder integral therewith provided with a bore 2 in which a piston 3 is reciprocably mounted. The piston may be provided with one or more sealing rings 4 which may be of the O type or conventional metal expansion rings in order to minimize leakage past the piston.

Figure 1:
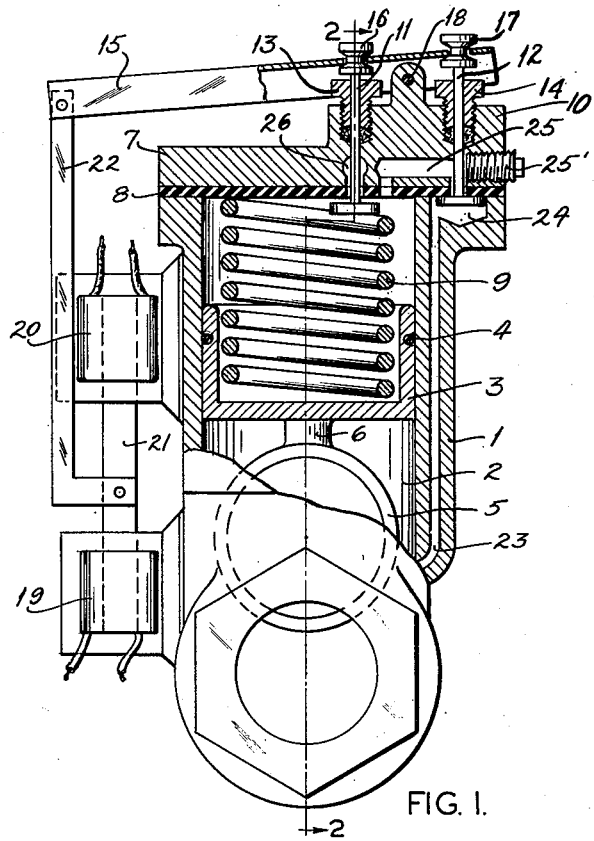
Fig. 1 is an end elevational view, partly in section, of a gate type valve embodying the invention.
Figure 2:
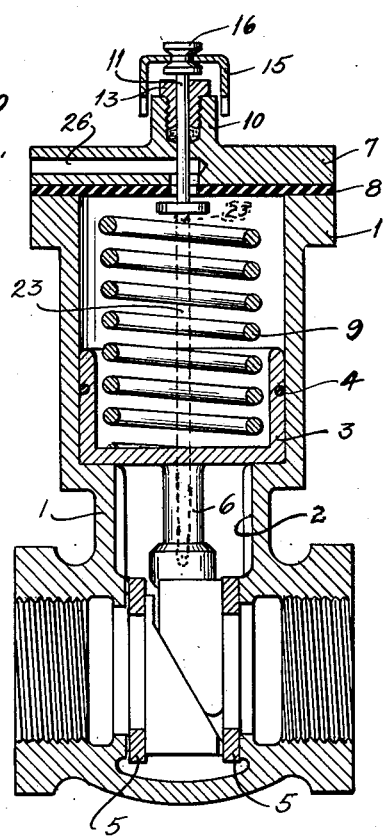
Fig. 2 is a view taken substantially along the line 2—2 of Fig. 1.

The gate portion of the valve comprises a pair of disc members 5, 5 each of which is intended to selectively close the apertures in the valve body through which pressure fluid flows. A wedge type connecting link 6 is disposed between the discs 5, 5 and is connected to the piston 3. The valve in Fig. 1 is shown in a partially opened position and in Fig. 2 is shown in the closed position, wherein it will be noted that the wedge portion 6 is so disposed with respect to the parallel discs 5, 5 that in cooperation with the pressure from the high pressure side of valve will aid in firmly seating the particular disc 5 on its cooperating seat. The opposite disc 5 will always be spaced a small distance from its cooperating seat to permit the passage of pressure fluid into the cylinder bore 2.

The cylinder portion of the valve body 1 is provided with a closure or cylinder head 7 and a suitable gasket 8, preferably of rubber, metal or other gasket material is inserted between the head 7 and the body 1. The gasket extends over the entire face of the head 7 and the choice of gasket material is dictated by the particular temperature, pressure or atmospheric conditions in which the valve is employed. The gasket 8 is intended to prevent leakage between the head 7 and body 1 and also serves as an abutting element or valve seat for the piston 3, when it functions as a valve. A spring 9 is disposed between the piston 3 and the head 7 with its associated gasket 8.

The head 7 has a boss 10 formed thereon in which suitable bores are provided in which the stems of valves 11 and 12 are slidably mounted, the valves seating on the gasket material 8. Suitable stuffing boxes 13 and 14 are threaded into the bore to prevent leakage to the atmosphere.

An actuating lever 15 is pivoted at its one end, by means of a pin 18, to an auxiliary boss or boss 10. The lever 15 is preferably channel shaped and the base of the channel is slotted to receive spools 16 and 17 secured to valves 11 and 12 respectively. Lever 15 actuates valves 11 and 12 to open and closed position when it is rotated about pin 18. One of the valves will be open and the other closed depending upon the direction of movement as will be observed in the drawings.

Means have been provided for moving or oscillating the lever 15 about pin 18 as an axis which comprises a pair of axially aligned solenoids 19 and 20 having a common armature 21, the solenoid 20 moving the lever 15 clockwise and the solenoid 19 moving the lever 15 counterclockwise. A link 22 connects the armature 21 with the lever 15 to transmit the movement of the armature to the lever when the solenoids are selectively energized. The solenoids are connected in suitable well known circuits and their energization is preferably controlled from a remotely located operator station.

A duct 23 is formed in the wall of body 1 whose source originates on the high pressure side of the valve. This duct terminates in a cavity 24 in which the head of poppet valve 12 is movable. This head controls the passageway leading from the cavity 24 to the duct 25 formed in the head 7 and exhausts into the portions of bore 2 above piston 3. A clean-out plug 25' for duct 25 is threaded in the cylinder head 7. A second duct 26 is formed in head 7 that leads to atmosphere and connects with that portion of bore 2 above piston 3, the head on valve 11 controlling the flow of fluid to the duct 26 from the bore portion described.

Assuming the valve to be in a closed position and connected in a gas or other fluid conducting conduit, poppet valve 11 will be closed and poppet valve 12 will be open thereby placing both sides or ends of piston 3 under equal pressure and with the spring 9 holding the valve gate closed. If solenoid 19 is now energized lever 15 will be rotated or moved counterclockwise thereby opening valve 11 and closing valve 12 or establishing the condition illustrated in Fig. 1. Valve 12 prevents conduit pressure from acting on piston 3 on its upper end and since the pressure is effective on the lower side of piston 3 it will move upwardly compressing spring 9 and exhausting fluid above the piston to atmosphere. Pressure acts on the lower side of piston 3 because one of the discs 5 does not contact its seat when the valve gate is closed. This upward motion of piston 3 will continue until the discs 5, 5 clear the passageway through the valve body 1. When the piston engages gasket 8 it acts as a seal, this being made possible by rounding the skirt end of the piston and the pressure acting on the lower end of piston 3 causes its opposite end to firmly seat on the gasket and prevent all possibility of leakage past the piston. Other piston end forms than that shown are however, contemplated, the foregoing having been found most satisfactory. If solenoid 20 is now energized the lever 15 will position poppet valves 11 and 12 opposite to that shown in Fig. 1 whereupon pressure fluid will be admitted to the portion of bore 2 above piston 3 thereby subjecting both ends thereof to equal pressure and enabling spring 9 to force piston 3 downwardly to close the valve gate. The solenoids need only be momentarily energized and only a slight movement of the lever 15 is necessary to effect an opening and closing of the valve gate.

Figure 3:
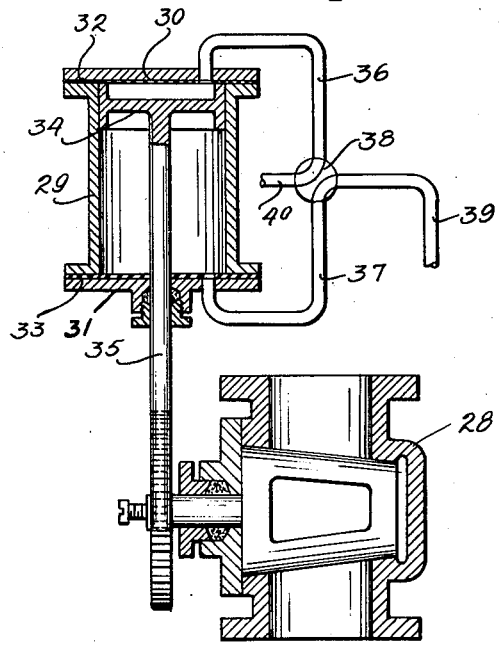
Fig. 3 is a view of a modified form of the invention as applied to a plug type valve.

The modification shown in Fig. 3 discloses a plug type valve 28 of conventional design which is actuated by a pressure fluid operated motor comprising a cylinder 29 provided with heads 30 and 31 each of which has a gasket 32 or 33 associated therewith similar in character to gasket 8 above. A piston whose ends may be constructed similar to piston 3 above is arranged in the cylinder and piston rod 35 connects the piston 34 with the stem of valve 28 in order to operate same by means of the schematically illustrated gear and rack. Suitable conduits 36 and 37 are connected to opposite ends of the cylinder 29 and also to a reversing valve 38 and a conduit 39 connected to a suitable source of pressure fluid customarily the high pressure side of the conduit connected to valve 28. A suitable exhaust conduit 40 is also connected to the reversing valve 38.

Assuming the valve 28 to be in the closed position shown and it is desired to open same reversing valve 38 will be shifted to admit pressure fluid to the conduit 36 thereby moving the piston 34 downwardly as viewed in Fig. 3. The piston will move until it engages the gasket 33 whereupon the piston will be seated and act as a seal to prevent leakage of pressure fluid and the pressure fluid acting on the piston will lock it in position. The same action takes place when the piston is reversely moved.

That which is regarded new, useful and novel and which is sought to be protected by Letters Patent of the United States is as follows:

A valve connectable in a pressure fluid conduit comprising a housing having a cylinder provided with a bore and a pressure fluid conducting passageway for association with the conduit; a cylinder head faced with gasket material for said cylinder; a reciprocable piston in said cylinder; a valve gate connected to said piston, the reciprocable movement of said piston opening and closing said gate; a pair of poppet valves in said head, one to control the admission to and the other to control the exhaust from said cylinder of pressure fluid to control the motion of said piston; a simple lever to selectively control said poppet valve means; a double solenoid for reversely actuating said lever, said piston when engaging said gasket acting as a seal to prevent the leakage of pressure fluid from the conduit; and spring means to close the valve gate when equal pressures act on both ends of said piston.

HOMER J. SHAFER.

REFERENCES CITED

The following references are of record in the file of this patent:

UNITED STATES PATENTS

| Number | Name | Date |
|---|---|---|
| 243,417 | Westinghouse | June 28, 1881 |
| 245,592 | Westinghouse | Aug. 9, 1881 |
| 625,792 | Naylor | May 30, 1899 |
| 926,400 | Freaney | June 29, 1909 |
| 1,177,718 | Merten | Apr. 4, 1916 |
| 1,407,810 | Renshaw | Feb. 28, 1922 |
| 1,526,812 | Thomas | Feb. 17, 1925 |
| 1,560,700 | Everstam | Nov. 10, 1925 |
| 1,566,814 | Bliss | Dec. 22, 1925 |
| 2,057,704 | Bragg | Oct. 20, 1936 |
| 2,172,855 | Siegert | Sept. 12, 1939 |
| 2,232,038 | Stone | Feb. 18, 1941 |
| 2,372,729 | Molloy | Apr. 3, 1945 |
| 2,420,550 | Miller | May 13, 1947 |

FOREIGN PATENTS

| Number | Country | Date |
|---|---|---|
| 4,651 | Great Britain | of 1883 |
| 417,438 | France | of 1910 |
| 625,792 | Great Britain | of 1899 |
| 609,081 | France | of 1926 |